United States Patent
Jackson

(10) Patent No.: US 9,320,390 B2
(45) Date of Patent: Apr. 26, 2016

(54) FOLDING SPATTER SHIELD

(71) Applicant: Gregory D. Jackson, Gardena, CA (US)

(72) Inventor: Gregory D. Jackson, Gardena, CA (US)

(73) Assignee: G. JACKSON CONCEPTS, Gardena, CA (US)

( * ) Notice: Subject to any disclaimer, the term of this patent is extended or adjusted under 35 U.S.C. 154(b) by 0 days.

(21) Appl. No.: 14/312,415

(22) Filed: Jun. 23, 2014

(65) Prior Publication Data

US 2015/0144637 A1 May 28, 2015

Related U.S. Application Data

(60) Provisional application No. 61/963,221, filed on Nov. 27, 2013.

(51) Int. Cl.

| | |
|---|---|
| *B65D 51/16* | (2006.01) |
| *A23N 15/00* | (2006.01) |
| *A47J 37/07* | (2006.01) |
| *A47J 37/10* | (2006.01) |
| *A47J 36/06* | (2006.01) |
| *A47J 36/38* | (2006.01) |
| *A47J 27/60* | (2006.01) |

(52) U.S. Cl.
CPC ............ *A47J 37/101* (2013.01); *A47J 36/06* (2013.01); *A47J 36/38* (2013.01); *A47J 27/60* (2013.01)

(58) Field of Classification Search
CPC ............................. A47J 37/101; A47J 36/06
USPC ............... 220/369–372, 819; 99/449, 645
See application file for complete search history.

(56) References Cited

U.S. PATENT DOCUMENTS

| 3,807,596 | A | * | 4/1974 | Baker | 220/369 |
| 4,414,704 | A | * | 11/1983 | Reuter | 16/223 |
| D621,217 | S | * | 8/2010 | Zemel | D7/408 |
| 2008/0272124 | A1* | | 11/2008 | Shamoon | 220/370 |
| 2014/0246437 | A1* | | 9/2014 | Lee et al. | 220/370 |

* cited by examiner

*Primary Examiner* — Shawn M Braden
(74) *Attorney, Agent, or Firm* — Kali Law Group P.C.

(57) ABSTRACT

Folding splatter shields are presented including: a handle; a middle panel mechanically coupled with the handle along a lateral edge of the middle panel, the middle panel including a middle panel mesh element; a first folding panel pivotally coupled with the middle panel along a first longitudinal edge of the middle panel; and a second folding panel pivotally coupled with the middle panel along a second longitudinal edge of the middle panel. In some embodiments, the first folding panel further includes a first folding panel mesh element and where the second folding panel further includes a second folding panel mesh element. In some embodiments, the middle panel further includes: a middle panel upper frame element defining a middle panel shape; and a middle panel lower frame element defining the middle panel shape.

9 Claims, 3 Drawing Sheets

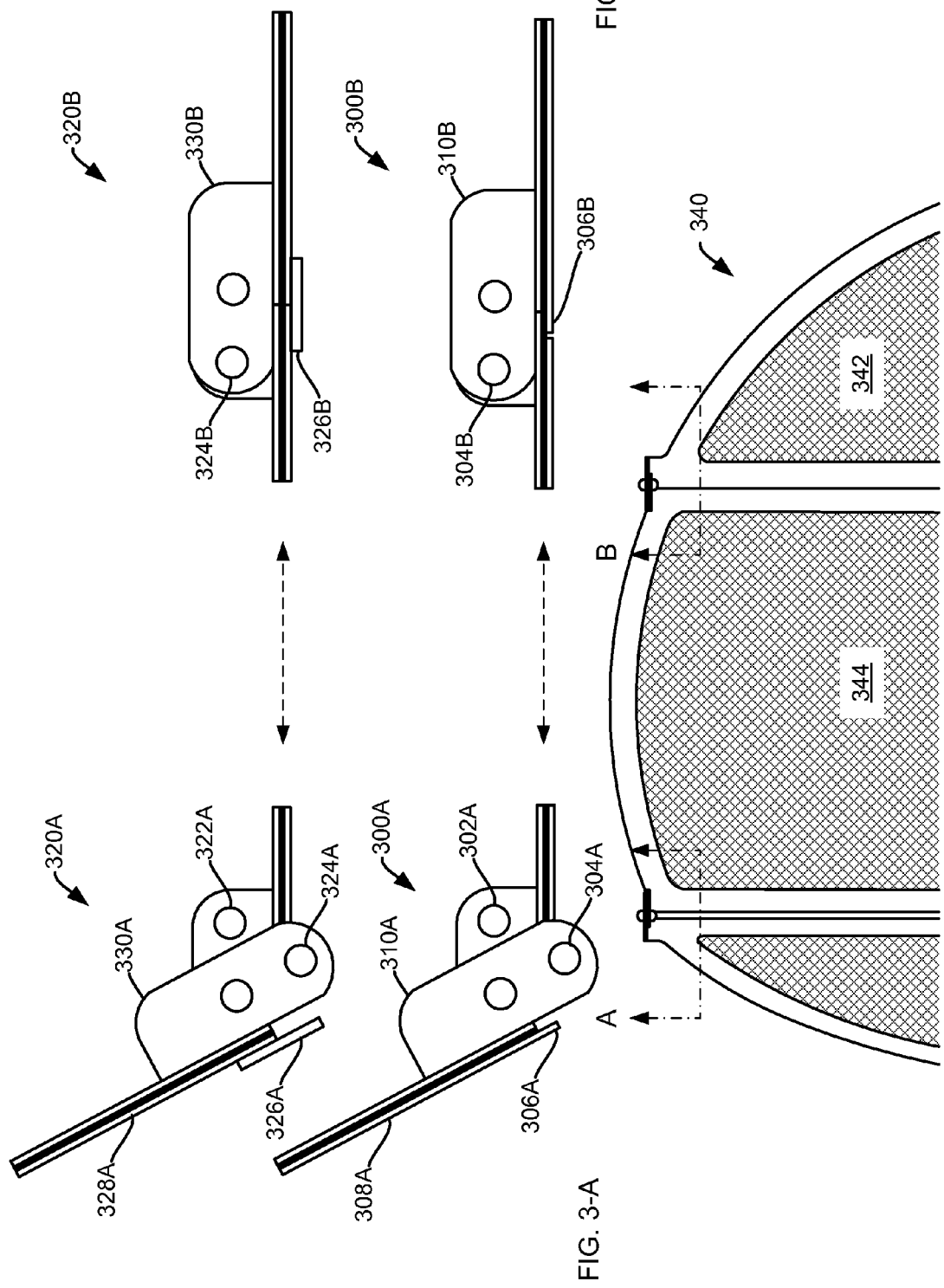

FOLDING SPATTER SHIELD

BACKGROUND

Spatter shields are generally well-known in the art. Spatter shields are useful for a variety of cooking purposes. For example, a spatter shield may protect a cook from spatter jumping from the pan when wet material is added to a hot oil mixture. In addition, a spatter shield allows vapor to leave the pan while keeping a cover over an open pan. In this manner, open pans are protected. Typically spatter shields are sized to fit an open round pan. Unfortunately, storing a large round spatter shield may not be convenient, especially in a small kitchen. As such, folding spatter shields are presented.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, folding splatter shields are presented including: a handle; a middle panel mechanically coupled with the handle along a lateral edge of the middle panel, the middle panel including a middle panel mesh element; a first folding panel pivotally coupled with the middle panel along a first longitudinal edge of the middle panel; and a second folding panel pivotally coupled with the middle panel along a second longitudinal edge of the middle panel. In some embodiments, the first folding panel further includes a first folding panel mesh element and where the second folding panel further includes a second folding panel mesh element. In some embodiments, the middle panel further includes: a middle panel upper frame element defining a middle panel shape; and a middle panel lower frame element defining the middle panel shape, where the middle panel mesh element is captured by the middle panel upper frame element and the middle panel lower frame element along a middle panel mesh element edge. In some embodiments, the middle panel shape forms a shape selected from the group consisting of: a middle portion of a circle and a middle portion of a quadrilateral. In some embodiments, the first folding panel further includes: a first folding panel upper frame element defining a first folding panel shape; and a first folding panel lower frame element defining the first folding panel shape, where the first folding panel mesh element is captured by the first folding panel upper frame element and the first folding panel lower frame element along a first folding panel mesh element edge. In some embodiments, the first folding panel shape forms a shape selected from the group consisting of: a first side portion of a circle and a first side portion of a quadrilateral.

In some embodiments, the first folding panel and the middle panel are pivotally coupled by a pair of hinges positioned along each end of the first longitudinal edge, where the pair of hinges each include a detent for positively engaging the first folding panel and the middle panel in an open position. In some embodiments, the first folding panel and the middle panel are pivotally coupled by a continuous hinge positioned along the first longitudinal edge. In some embodiments, the second folding panel and the middle panel are pivotally coupled by a pair of hinges positioned along each end of the second longitudinal edge, where the pair of hinges each includes a detent for positively engaging the second folding panel and the middle panel in an open position. In some embodiments, folding spatter shields further include an overlapping tab mechanically coupled with the first folding panel lower frame element along the longitudinal edge, the overlapping tab sized to overlap a gap between the middle panel and the first folding panel. In some embodiments, folding spatter shields further include an overlapping tab mechanically coupled with the middle panel frame element along the longitudinal edge, the overlapping tab sized to overlap a gap between the middle panel and the first folding panel.

In other embodiments, folding splatter shields are presented including: a handle; a middle panel mechanically coupled with the handle along a lateral edge of the middle panel, the middle panel including: a middle panel mesh element, a middle panel upper frame element defining a middle panel shape, and a middle panel lower frame element defining the middle panel shape, where the middle panel mesh element is captured by the middle panel upper frame element and the middle panel lower frame element along a middle panel mesh element edge; a first folding panel pivotally coupled with the middle panel along a first longitudinal edge of the middle panel, the first folding panel including: a first folding panel mesh element, a first folding panel upper frame element defining a first folding panel shape, and a first folding panel lower frame element defining the first folding panel shape, where the first folding panel mesh element is captured by the first folding panel upper frame element and the first folding panel lower frame element along a first folding panel mesh element edge, and where the first folding panel lower frame is formed to overlap the middle panel upper frame in an open position; and a second folding panel pivotally coupled with the middle panel along a second longitudinal edge of the middle panel, the second folding panel including: a second folding panel mesh element, a second folding panel upper frame element defining a second folding panel shape, and a second folding panel lower frame element defining the second folding panel shape, where the second folding panel mesh element is captured by the second folding panel upper frame element and the second folding panel lower frame element along a second folding panel mesh element edge, and where the second folding panel lower frame is formed to overlap the middle panel upper frame in the open position. In some embodiments, the first folding panel and the middle panel are pivotally coupled by a first pair of hinges positioned along each end of the first longitudinal edge, where the first pair of hinges each include a first detent for positively engaging the first folding panel and the middle panel in the open position, and where the second folding panel and the middle panel are pivotally coupled by a second pair of hinges positioned along each end of the second longitudinal edge, where the second pair of hinges each include a second detent for positively engaging the second folding panel and the middle panel in the open position.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is an illustrative representation of hinges for a folding spatter shield in accordance with embodiments of the present invention.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 1:
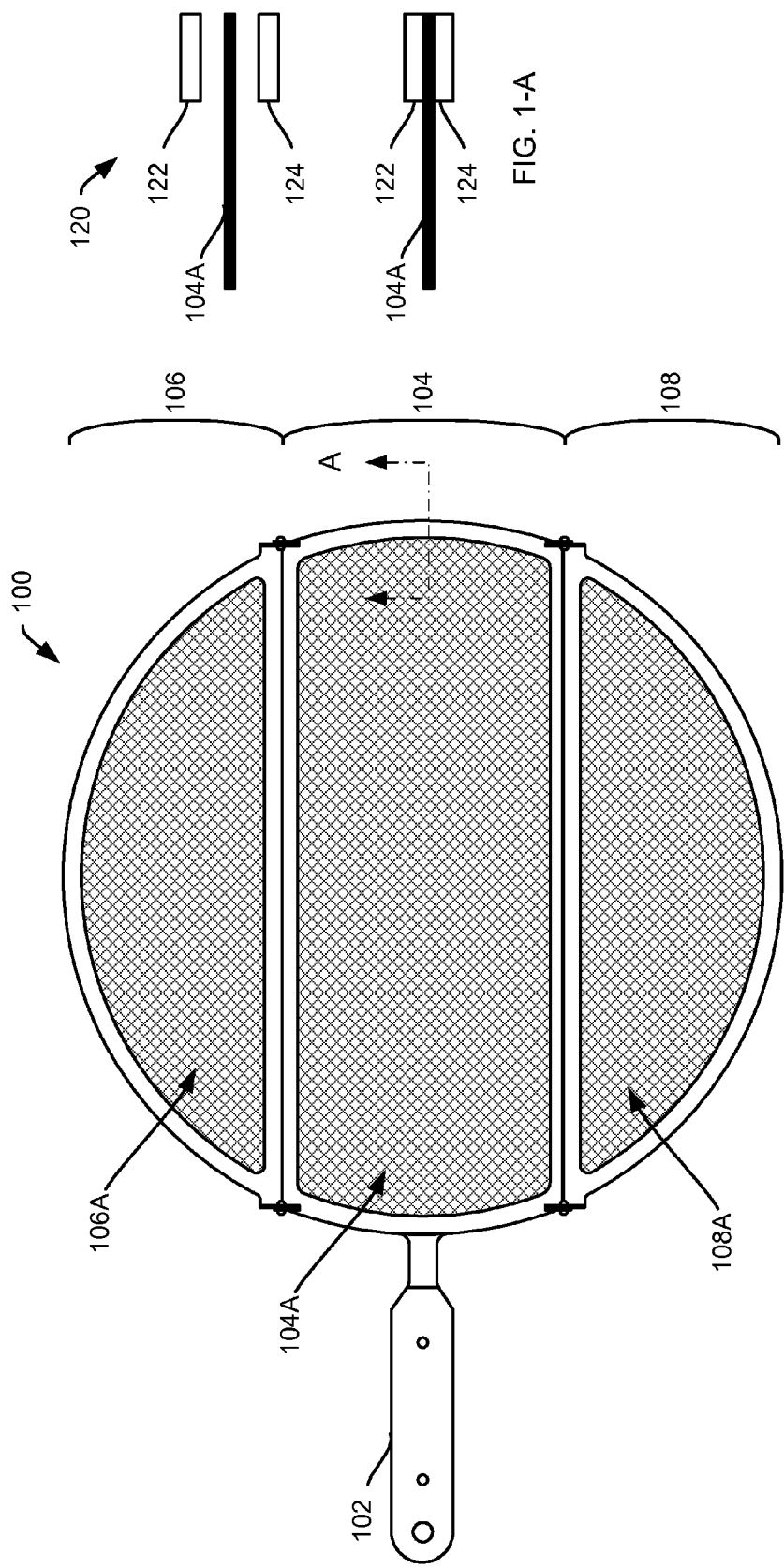
FIG. 1 is an illustrative representation of a folding spatter shield in accordance with embodiments of the present invention.

FIG. 1 is an illustrative representation of a folding spatter shield 100 in accordance with embodiments of the present invention. As illustrated, folding spatter shield 100 may include handle 102, which may be mechanically coupled with middle panel 104 along a lateral edge of middle panel 104. Handle embodiments may be mechanically coupled with middle panel embodiments in any manner known in the art such as bonded, welded, tacked, stamped, or may be integrally formed from a frame element without limitation. Frame elements will be discussed in further detail in FIG. 1-A below. As illustrated, middle panel 104 may further include middle panel mesh element 104A. Middle panel mesh element embodiments may be manufactured from a material such as: a metallic material, a metalized material, a polymeric material, and a silicone/polymeric material. In addition, middle panel mesh elements may have a mesh opening size in a range of approximately 0.50 mm to 4.75 mm. In some embodiments, a more preferable mesh opening size may be approximately 1.00 mm. It may be appreciated that the use of mesh may allow a cook to continuously inspect food being prepared as well as allow steam to escape safely while preventing larger drops of spatter from escaping. As illustrated, middle panel 104 may define a middle panel shape that forms a middle portion of a circle. However, any other shape may be utilized without limitation such as a middle portion of a quadrilateral (not shown).

Further illustrated are folding panels 106 and 108. Each folding panel may be pivotally coupled with middle panel 104 along a longitudinal edge of middle panel 104. As illustrated, folding panels 106 and 108 may further include folding panel mesh elements 106A and 108A respectively. Folding panel mesh element embodiments may be manufactured from a material such as: a metallic, material, a metalized material, a polymeric material, and a silicone/polymeric material. In addition, mesh elements may have a mesh opening size in a range of approximately 0.50 mm to 4.75 mm. In some embodiments, a more preferable mesh opening size may be approximately 1.00 mm. It may be appreciated that the use of mesh may allow a cook to continuously inspect, food being prepared as well as allow steam to escape safely while preventing large drops of spatter from grease or water from escaping. In still other embodiments, folding panels 106 and 108 may include a folding panel solid element to enclose a pan being covered. A partial covering may be useful in some preparation where some heat retention may be desirable. As illustrated, folding panel may define a folding panel shape that forms a side portion of a circle. However, any other shape may be utilized without limitation such as a side portion of a quadrilateral.

Further illustrated is a cross-sectional representation of a portion of folding spatter shield 100 as shown in FIG. 1-A corresponding with line A. As illustrated, middle panel cross-section 120 may include middle panel upper frame element 122, middle panel lower frame element 124. These middle panel upper and lower elements may be utilized to capture a middle panel mesh element 104A along its edge. Middle panel upper and lower frame elements may be coupled in any manner known in the art without departing from embodiments provided herein. For example, middle panel upper and lower frame element embodiments may be spot welded, edge welded, tacked, press fit, riveted, screwed, or bolted without limitation. As noted above, middle panel upper and lower frame elements may define a middle panel shape that forms a middle portion of a circle as illustrated. However, any other shape may be utilized without limitation such as a middle portion of a quadrilateral (not shown).

In like manner, a folding panel cross-section (similar to 120) may include a folding panel upper frame element (similar to 122), folding panel lower frame element (similar to 124). Folding panel upper and lower elements may be utilized to capture a folding panel mesh element such as 106A and 108A along their edges. Folding, panel upper and lower frame elements may be coupled in any manner known in the art without departing from embodiments provided herein. For example, folding panel upper and lower frame element embodiments may be spot welded, edge welded, tacked, press fit, riveted, screwed, or bolted without limitation. As noted above, folding panel upper and lower frame elements may define a folding panel shape that forms a side portion of a circle as illustrated. However, any other shape may be utilized without limitation such as a side portion of a quadrilateral (not shown).

Figure 2:
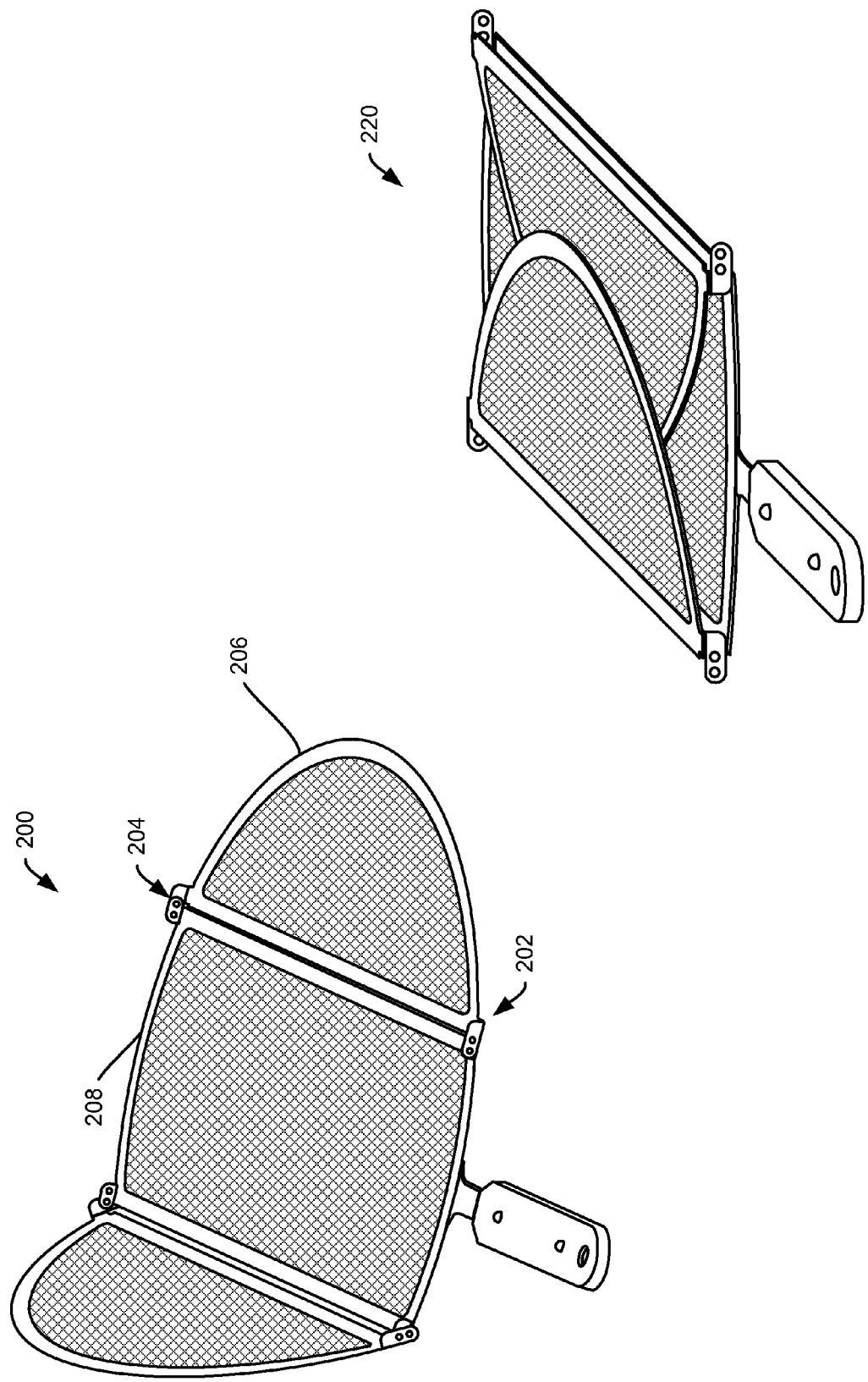
FIG. 2 is an illustrative representation of a folding spatter shield in accordance with embodiments of the present invention.

FIG. 2 is an illustrative representation of a folding spatter shield in accordance with embodiments of the present invention. In particular, FIG. 2 illustrates a folding spatter shield in a partially open position 200 and folded position 220. As illustrated, in embodiments, folding may be accomplished utilizing pairs of hinges such as hinge pair 202 and 204 that are positioned along each end of a longitudinal edge defined by folding panel 206 and middle panel 208. Hinges will be discussed in further detail below for FIG. 3. In addition to hinge pairs, some embodiments may further include a continuous hinge (not shown) positioned between a middle panel and folding panels. Indeed any method of pivoting or hinging known in the art may be utilized without departing from embodiments provided herein.

FIG. 3 is an illustrative representation of hinges for a folding spatter shield in accordance with embodiments of the present invention. In particular FIG. 3-A is an illustrative cross-sectional representation of folding spatter shield 340 at line A. In addition FIG. 3-B is an illustrative cross-sectional representation of folding spatter shield 340 at line B. Furthermore FIG. 3-A shows pivoting assemblies 300A and 320A in a partially open position while FIG. 3-B shows pivoting assemblies 300B and 320B in a fully open position. As illustrated, pivoting assembly 300A includes hinge 310A. As may be appreciated, in folding spatter shields utilizing a hinge, a gap may be required to avoid interference with the hinging mechanism. Unfortunately, a gap may provide an egress point for spatter such as hot grease, which may create a hazard for the cook. In order to overcome the required gap, overlap 306A may be formed from folding panel lower frame 308A. Turning briefly to FIG. 3-B, when hinge 310B is in a fully open position, the required gap is dosed by overlap 306A. It may be appreciated that FIGS. 3-A and 3-B are mirror images of each other. Returning to FIG. 3-A, pivoting assembly 300A may further include detent 302A and 304A. A detent may be useful in securing hinge 310A in an open position so that folding panels do not inadvertently pivot during use. As seen in FIG. 3-B, pivoting assembly 300B is in an open position where detent 304B has positively engaged folding panel 342 with middle panel 344 in the open position.

As illustrated, pivoting assembly 320A includes hinge 330A. As may be appreciated, in folding spatter shields utilizing a hinge, a gap may be required to avoid interference with the hinging mechanism. Unfortunately, a gap may provide an egress point for spatter such as hot grease, which may create a hazard for the cook. In order to overcome the required gap, overlap tab 326A may be coupled with folding panel lower frame 328A. Turning briefly to FIG. 3-B, when hinge 330B is in a fully open position, the required gap is closed by overlap tab 326B. It may be appreciated that FIGS. 3-A and 3-B are mirror images of each other. Returning to FIG. 3-A, pivoting assembly 320A may further include detent 322A and 324A. A detent may be useful in securing hinge 330B in an open position so that folding panels do not inadvertently pivot during use. As seen in FIG. 3-B, pivoting assembly 320B is in an open position where detent 324B has positively engaged folding panel 342 with middle panel 344 in the open position. It may be appreciated that overlap tabs may be coupled with folding lower panels in any manner known in the art without limitation including, for example, welding, spot welding, riveting, bolting, press fitting, gluing, bonding, and the like. In addition, overlap tabs may be manufacture from any temperature suitable material without limitation and without departing from embodiments provided herein.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A folding splatter shield comprising:
   a handle;
   a middle panel mechanically coupled with the handle along a lateral edge of the middle panel, the middle panel including:
      a middle panel mesh element,
      a middle panel upper frame element defining a middle panel shape, and
      a middle panel lower frame element defining the middle panel shape, wherein
         the middle panel mesh element is captured by the middle panel upper frame element and the middle panel lower frame element along a middle panel mesh element edge;
   a first folding panel pivotally coupled with the middle panel along a first longitudinal edge of the middle panel, the first folding panel including:
      a first folding panel mesh element,
      a first folding panel upper frame element defining a first folding panel shape, and
      a first folding panel lower frame element defining the first folding panel shape, wherein
         the first folding panel mesh element is captured by the first folding panel upper frame element and the first folding panel lower frame element along a first folding panel mesh element edge, and wherein
         the first folding panel lower frame is formed to overlap the middle panel upper frame in an open position; and
   a second folding panel pivotally coupled with the middle panel along a second longitudinal edge of the middle panel, the second folding panel including:
      a second folding panel mesh element,
      a second folding panel upper frame element defining a second folding panel shape, and
      a second folding panel lower frame element defining the second folding panel shape, wherein
         the second folding panel mesh element is captured by the second folding panel upper frame element and the second folding panel lower frame element along a second folding panel mesh element edge, and wherein
         the second folding panel lower frame is formed to overlap the middle panel upper frame in the open position.

2. The folding spatter shield of claim 1, wherein
   the first folding panel and the middle panel are pivotally coupled by a first pair of hinges positioned along each end of the first longitudinal edge, wherein the first pair of hinges each include a first detent for positively engaging the first folding panel and the middle panel in the open position, and wherein
   the second folding panel and the middle panel are pivotally coupled by a second pair of hinges positioned along each end of the second longitudinal edge, wherein the second pair of hinges each include a second detent for positively engaging the second folding panel and the middle panel in the open position.

3. The folding spatter shield of claim 1, wherein the middle panel shape forms a shape selected from the group consisting of: a middle portion of a circle and a middle portion of a quadrilateral.

4. The folding spatter shield of claim 1, wherein
   the first folding panel shape forms a shape selected from the group consisting of: a first side portion of a circle and a first side portion of a quadrilateral, and wherein
   the second folding panel shape forms a shape selected from the group consisting of: a second side portion of a circle and a second side portion of a quadrilateral.

5. The folding spatter shield of claim 1, wherein the first folding panel and the middle panel are pivotally coupled by a continuous hinge positioned along the first longitudinal edge.

6. The folding spatter shield of claim 1, further comprising a first overlapping tab mechanically coupled with the first folding panel lower frame element along the first longitudinal edge, the first overlapping tab sized to overlap a first gap between the middle panel and the first folding panel.

7. The folding spatter shield of claim 1, further comprising a second overlapping tab mechanically coupled with the second folding panel lower frame element along the second longitudinal edge, the second overlapping tab sized to overlap a second gap between the middle panel and the second folding panel.

8. The folding spatter shield of claim 1, further comprising an overlapping tab mechanically coupled with the middle panel frame element along the longitudinal edge, the overlapping tab sized to overlap a gap between the middle panel and the first folding panel.

9. The folding spatter shield of claim 1, wherein the middle panel mesh element is manufactured from a material selected from the group consisting of: a metallic material, a metalized material, a polymeric material, and a silicone/polymeric material.

\* \* \* \* \*